Figure 1:
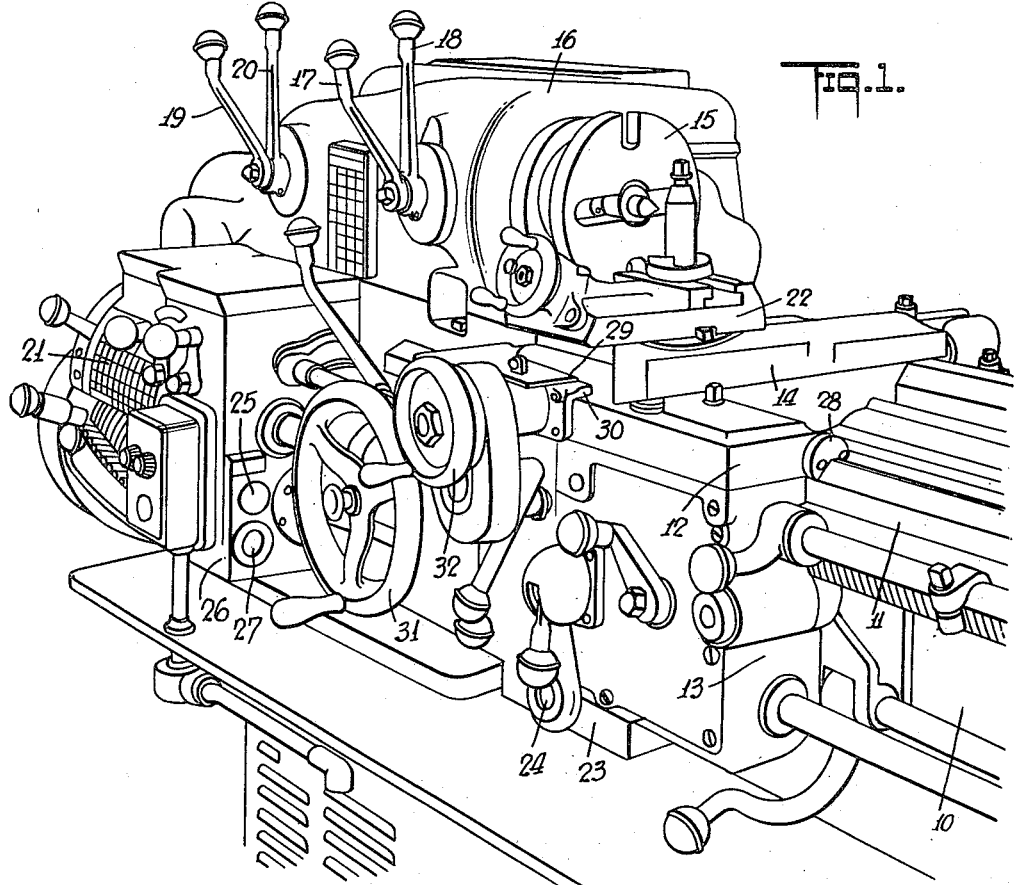

Dec. 21, 1954     E. H. KOCHER     2,697,493
LUBRICATION

Original Filed Aug. 3, 1940     3 Sheets-Sheet 1

INVENTOR
Edward H. Kocher
BY
ATTORNEYS

Dec. 21, 1954   E. H. KOCHER   2,697,493
LUBRICATION
Original Filed Aug. 3, 1940   3 Sheets-Sheet 2
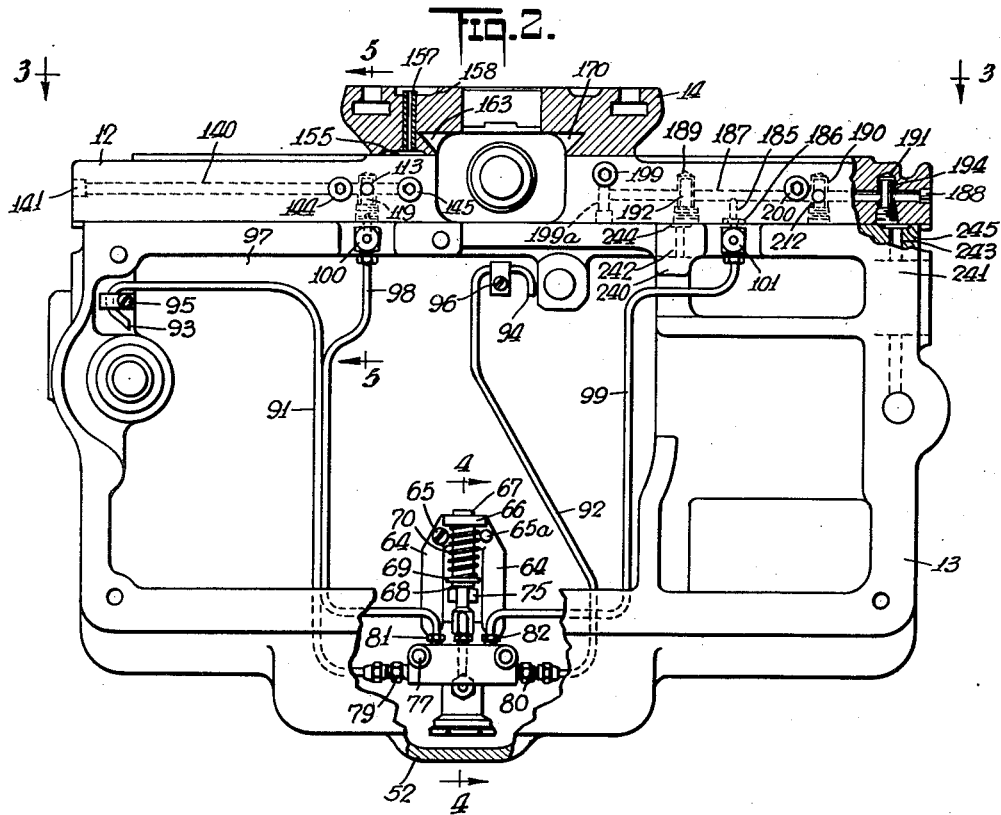
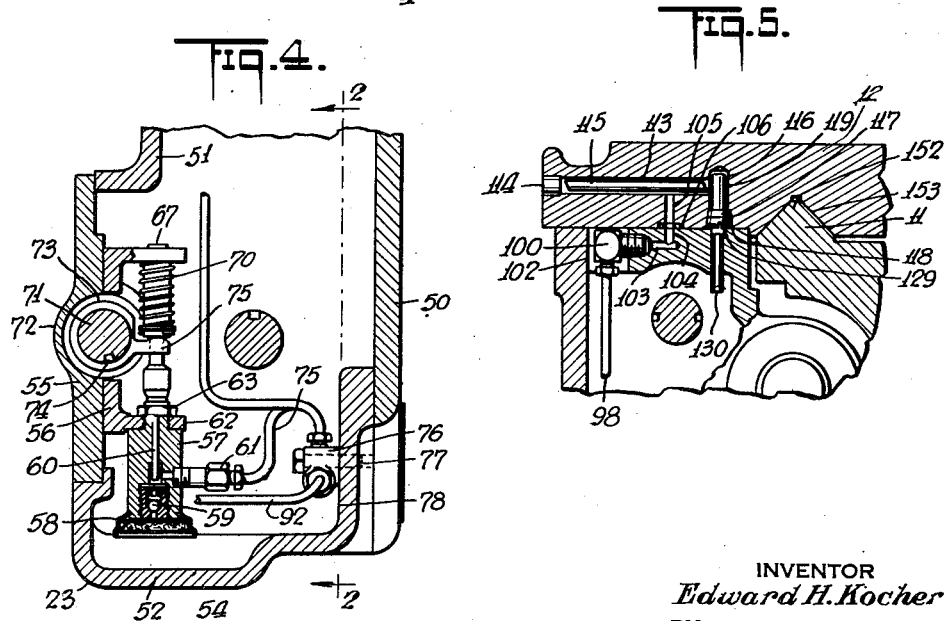
INVENTOR
Edward H. Kocher
BY
ATTORNEYS Dec. 21, 1954 E. H. KOCHER 2,697,493
LUBRICATION
Original Filed Aug. 3, 1940 3 Sheets-Sheet 3
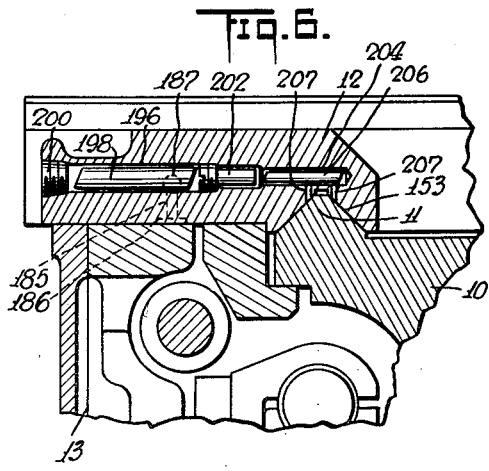
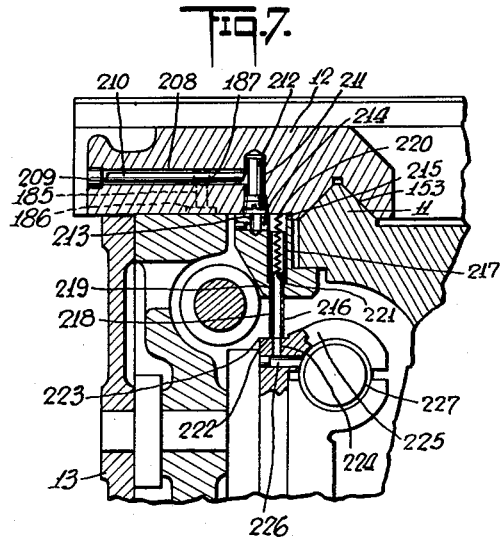
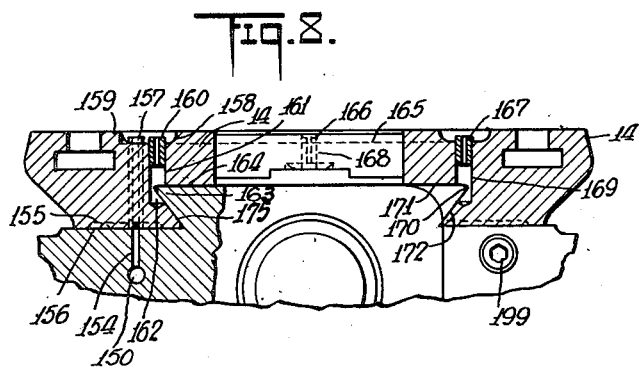
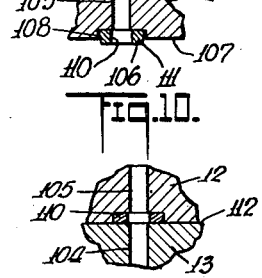
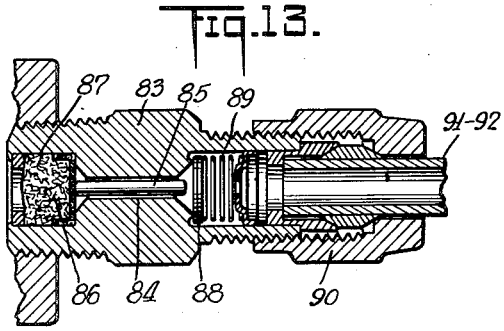
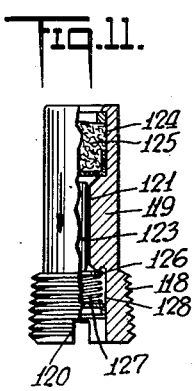
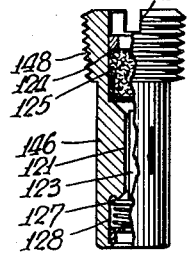
INVENTOR
*Edward H. Kocher*
BY
ATTORNEYS United States Patent Office 2,697,493
Patented Dec. 21, 1954

2,697,493

LUBRICATION

Edward H. Kocher, Boonton, N. J., assignor to Auto Research Corporation, a corporation of Delaware Original application August 3, 1940, Serial No. 350,653. Divided and this application January 24, 1947, Serial No. 723,925

8 Claims. (Cl. 184—6)

The present invention relates to improvements in lubricating installations, and it particularly relates to lubricating installations adapted for utilization in lathes and other machine tools.

It is among the objects of the present invention to provide improved lubricated machine tools, particularly those having sliding bearings, such as lathes, in which the various bearings will be automatically lubricated, including the ways and apron bearings, and in which the lubricating installation will be substantially completely concealed, durable and give assurance of proper supply of lubricant to the bearings without attention from the operator and without overflow of lubricant.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable to provide a relatively small compact reciprocatory pump in a chamber substantially at the bottom of the apron thereof, which will feed lubricant to a junction, which in turn will have tubing or conduit connections to the ways and other bearings in and about the mechanism to be lubricated.

Associated with such junction or with the bearings will be high restriction metering fittings which will serve to proportion the quantity of lubricant supplied to the bearings.

In the drawings, which show one of the various forms of the present invention, but to which the invention is by no means restricted, since many changes and alterations may be made therein all within the scope of the present invention.

Figure 3:
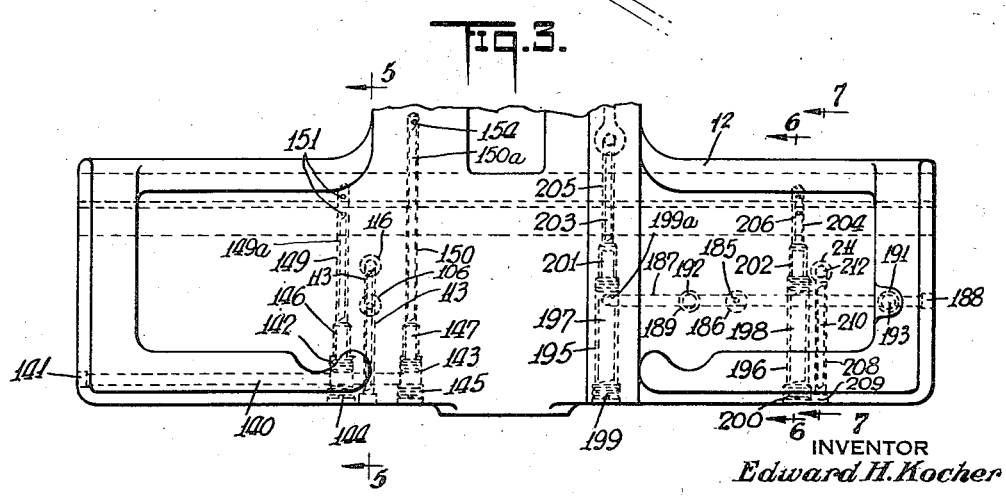

Fig. 1 is a side perspective view of the lathe to which the lubricating installation of the present invention may be most satisfactorily applied, Fig. 2 is a transverse sectional view parallel to the main axis of the lathe showing the reservoir construction in the apron and some of the bearings to be lubricated, Fig. 3 is a top view upon the line 3—3 of Fig. 2, Fig. 4 is a side sectional view upon the line 4—4 of Fig. 2, Figs. 5, 6, 7 and 8 are respectively side sectional views upon the lines 5—5, 6—6, 7—7 and 8—8 of Fig. 3, Figs. 9 and 10 are diagrammatic detail enlarged sectional views, indicating the manner of sealing the passages across the parts to be lubricated, Figs. 11 and 12 are respectively longitudinal sectional views through two types of flow metering fittings employed in the distributing system shown in Figs. 1 to 8, Fig. 13 is a longitudinal sectional view of junction type or reverse flow metering unit upon an enlarged scale as compared to Figs. 1 to 8.

Referring to Fig. 1, the lathe is provided with a base structure 10 carrying the ways 11, which in turn support the carriage 12 having the apron 13.

The carriage 12 carries the transverse structure 14, which in turn supports the tool carrier 22.

The lathe is provided with the head stock 15, the various driving mechanisms of which are concealed in the casing 16. The levers 17 and 18, 19 and 20, and the arrangement 21 enable control of the speed of rotation and transverse of the lathe mechanism.

In the lower portion of the structure 13 of Fig. 1 is positioned the pocket 23, which serves to receive lubricant and which is provided with an oil window 24.

The structure 25 is also provided with a pocket 26 having oil window 27 to enable gauging depth of the lubricant therein.

The bearings primarily to be lubricated are those on the ways 11 formed by the sliding members 28 and those formed by the sliding structures 29 and 30. The entire carriage 12 may be traversed by the hand wheel 31, while the tool carrier 14 may be traversed by the hand wheel 32.

It is to the lubrication of the bearings associated with the carriage 12 that this invention will be particularly directed, although it is to be understood that the installation set forth in the present application is also applicable to the lubrication of other machine tool structures.

The interior of the apron structure 13 is best shown in Figs. 2 and 4.

It will be noted that the bottom of the apron has the walls 50 and 51, to which is connected the pocket member 23 having the bottom wall 54 and the rear wall 55.

The recess 52 below the filter unit 58 attached to the pump 57 forms a pocket for sludge or other foreign matter.

Attached to the rear wall 55 by the bracket 56, is the pump 57 having the inlet strainer 58, the inlet check valve 59 and the reciprocating elongated unpacked plunger 60 and the outlet ball check unit 61.

The bracket 56 carries the pump 57 through its leg 62, and the pump 57 is connected thereto by the nuts 63.

The bracket 56 has the outstanding side portions 64 (see Fig. 2), which are bolted at 65 and fixed by dowel pin 65a to the wall 55, and it is also provided with an upper leg 66 which forms a bearing for the connecting rod 67. The pump or plunger shaft 67 is shouldered at 68 and above its shoulder it has a washer 69 against which reacts a spring 70. The upper end of the spring 70 reacts against the leg 66.

The spring 70 tends to press the plunger rod 67 and the plunger 60 downwardly to discharge position. The plunger rod 67 is actuated from the oscillatable shaft 71 which extends through a structure 72 in the front wall 55 of the apron. The collar 73 fixed on said shaft 71 by the key 74 is provided with a clevis member 75 which fits below said shoulder 68 of the plunger rod 67. The oscillatable shaft or shifter lever rod 71 is operated to cause engagement of a feed screw and feed nut to effect movement of the carriage. The shaft or rod 71 cannot rotate completely due to the collar 73 and clevis 75. The shaft or rod 71 may be referred to hereafter either as a shifter shaft or a shifter lever rod. The feed screw and nut construction which is actuated by the rod or shaft 71 is not shown or described.

The rotating of the shaft 71 in starting the feed will ordinarily lift the plunger 60 of the pump 57, drawing a charge through the filter 58. This charge ordinarily will vary between 5 to 25 drops of oil, with an optimum of about 12 drops of oil.

Upon reversal of the motion of the shaft 71 when the feed is stopped, the plunger will be lowered by the stressed spring 70, which will cause a discharge of oil past the outlet check valve 61 at a pressure of about 50 pounds per square inch at normal room temperature.

The volume of the oil delivered by the pump 57 will always be constant regardless of temperature, oil viscosity and other factors, since a fixed volume pump is utilized.

The outlet tube 75 leads from the ball check 61 to the junction 76 which is bolted at 77 to the wall 78 of the pocket in the reservoir. The junction is provided with two restricted outlets 79 and 80 and the two unrestricted outlets 81 and 82.

The restricted outlets 79 and 80 are formed in part by the flow metering fittings of the type illustrated in Fig. 13, having a body 83, a bore 84 substantially fully restricted by the pin 85 forming a very narrow annular crevice of the order of one or several thousandths of an inch having a substantially greater flow restricting effect than the tubing or the bearings. There is also provided an inlet filter or strainer 86 in an inlet socket 87. The fitting has a coupling connection at its outlet end 90 to the tubes 91 and 92. A spring seated valve 88 is disposed in socket 89 in said outlet end.

Tubes 91 and 92 feed metered or proportioned quantities of lubricant to the gear trains through the drip portions 93 and 94 (as shown in Fig. 2). The tubes 91 and 92 are clipped at 95 and 96 to the upper portion 97 of the side wall of the apron.

The unrestricted tubing connections 98 and 99 are connected by the elbow adaptor 100 and 101 to the bore systems within the upper portion of the carriage of the lathe.

As shown best in Fig. 5, the elbow adaptor 100 fits in the space 102 at the top of the apron and just below the carriage where it feeds the bore 103, which in turn connects to the transverse vertical bore 104. This vertical bore 104 communicates with bore 105 in the upper portion of the carriage structure with a lubricant-tight seal being made by the washer 106.

Figs. 9 and 10 show the manner of forming this seal in which one of the contacting faces 107, as shown in Fig. 9 is recessed at 108 around the bore 105 and receives a frusto-conical sealing washer 106 having a central bore 110.

It will be noted that the lower face 111 of this compressible washer 106 projects substantially below the face 107 of the carriage and the face 112 of the apron 13 is pressed up against the face 111 of the washer 106. When this happens, the washer 106 will be expanded sidewardly into the recess 108 to fill the same and form a lubricant-tight seal.

The compression and sealing of the washer 106 takes place automatically upon assembly of the carriage and the apron and this avoids the need of tubing connections with the corresponding difficulty of assembling and disassembling such units. The washer 106 may be readily inserted in recess 108 without difficulty before assembly.

The bore 105 (see Fig. 5) communicates with the transverse passage 113, which is plugged at 114 and is substantially completely filled with the filler pin 115 having the oblique end faces. The bore 113 feeds the socket 116, the lower end of which is widened and threaded at 117 to receive the threaded head 118 of the flow metering fitting 119.

In Fig. 11 is shown the flow metering fitting of Fig. 5, in which the lubricant flow takes place toward the threaded head 118.

It will be noted that the threaded head 118 has a pipe thread so that when tightened it will automatically be lubricant tight.

The end of the head 118 is provided with a fillister slot 120 enabling it to be screwed into the socket 116. The body 119 is provided with a bore 121, which is substantially completely filled by the pin 123 forming a very narrow annular crevice of the order of one or several thousandths of an inch having a substantially greater flow restricting effect than the tubing or the bearings.

In the inlet socket 124 is positioned the strainer 125 and in the outlet socket 128 is a check valve 126 which is pressed against the seat by the spring 127. The lubricant after passing the flow metering unit 119, as shown in Fig. 5, will be at a relatively low pressure and it will not be necessary to provide a seal or gasket, such as 106. The lubricant will then drip directly into the recess 129 in the upper portion of the apron structure, which is provided with a depending drip pipe 130 which permits lubricant to drip upon one of the gear trains.

Communicating with the bore 113 is also the transverse bore 140 (see Figs. 2 and 3), which is plugged at 141 in the end of the carriage. This bore feeds two sockets 142 and 143, which are sealed at 144 and 145 and the outlets of which are restricted by the flow metering fittings 146 and 147. The flow metering units 146 and 147 differ from the metering unit 119, as shown in Fig. 11 in that the threaded connection 148 is at the inlet end rather than at the outlet end, and this pipe threaded head 148 will seal the inlet end of each socket 142 and 143.

This reversed unit is shown in Fig. 12. The other parts of the unit of Fig. 12 are the same as those of Fig. 11 and are indicated by the same numerals.

Beyond the units 146 and 147 are positioned the bores 149 and 150 (see Fig. 3).

The bore 149 has the capillary openings 151 (see Fig. 3), which feed lubricant to both sides of the peak of the way 11 in the manner shown by the corresponding capillary passages 207 which are fed from the meter unit 202 and the passageways 204 (see Fig. 6). The lubricant flows down over the sides 153 of the way 11 to assure thorough lubrication thereof.

The other passage 150 feeds lubricant to the upwardly extending small bore 154 (see Fig. 8), which feeds lubricant to the grooves 155, which in turn supply lubricant to the bearing face surface 156, which in part of the bearing of the cross slide.

A tube 157 is placed in the cross slide 14. The tube 157 will receive lubricant from the grooves 155 and will in turn feed it to the reservoir or groove 158 formed in the upper face 159 of the cross slide 14.

The lubricant will fill up the small recess or reservoir 158 which, in turn, has an overflow tube 160 with small bore fitting into the vertical passageway 161 therein. The upper end of the small bore tube 160 is below the upper end of the tube 157. The lubricant will flow down into the recess 162, where it will be supplied to the corner 163 of the cross slide bearings and then flow over the bearing faces 175 and 156 which are to be lubricated.

The lubricant from the small reservoir 158 will flow through the groove or recess 165 to feed the overflow small bore tubes 166 and 167 fitted in the recesses 168 and 169 in the cross slide 14.

The lubricant which overflows through the tube 166, will feed the feed screw nut bearing (not shown), while that which overflows through the tube 167 will feed the corner 170 of the cross slide bearing, from whence lubricant will pass to the faces 171 and 172.

The upper ends of the tubes 160, 166 and 167 are all at the same level and the small bores are of the same diameter and the same length so that the overflow which takes place in these tubes will all be about substantially the same.

At the other side of the carriage, as shown best in Figs. 2, 3, 6 and 7, the lubricant will pass from the adapter fitting 101 to the vertical bore 185, past a gasket 186 of the same character as the gasket 106 shown in Fig. 5.

Lubricant will then flow into the transverse bore 187 which is plugged at 188 and from this header will flow into the sockets 189, 190 and 191, the outlet of each of which is sealed by a metering unit 192, 212 and 194 of the same construction as already described in connection with Fig. 11.

The lubricant from the header 187 will also flow into the transverse bores 195 and 196 (see Fig. 3), which are substantially completely filled by the pins 197 and 198 and plugged at one end by the plugs 199 and 200. The bore 195 is provided with the connecting passageway 199a. The pasageways 197 and 198 are sealed by the flow metering restriction units 201 and 202, which are of the same construction as already described in connection with Fig. 12.

The plugs 144, 145, 199 and 200 may be removed where it is desired to remove or replace the metering units 146 and 147, 201 and 202 (see also Fig. 3). This is best shown in connection with unit of Fig. 6.

Referring to Figs. 3 and 6, beyond the units 201 and 202 the passageways 203 and 204 receive the lubricant and are filled by the filler members 205 and 206 to reduce the volume of the passageway, which must be filled with lubricant.

As shown best in Fig. 6, the passageway 204 feeds the two small or capillary bores 207 which supply lubricant to the opposite faces 153 of the way 11 upon which the carriage 12 travels upon the bed 10.

The two passageways 207, as well as the passageways 151 in Fig. 3, are capillary holes and since the passageways 204 and 149 are substantially filled with lubricant at all times, oil will be fed to the bearings only when lubricant is forced into the passageway past the metering units 146 and 202 to feed lubricant evenly to the slide bearings 153 of the way 11.

As shown in Fig. 7, the main feed bore 187 also feeds the bore 208 plugged at 209 and having the filler pin 210 to reduce the volume thereof. The passageway 208 feeds the socket 211, the outlet of which is filled by the meter unit 212 of the same construction as Fig. 11.

The lubricant from the meter unit 212 will pass into the socket 213 and then into the transverse bore 214 into the recess 215. The recess 215 carries a hollow plunger member 216 having an upper enlarged portion 217 closely fitting in the socket 215 and a lower tubular portion 218 closely fitting in the bore 219.

The spring 220 reacts against the shoulder 221 of said element 216, and presses the same downwardly so that its lower edge 222 will press on the shoulder 223 around the bore 224 in the half nut 225.

A transverse bore 226 in the half nut 225 is fed from the vertical bore 224 and this feeds lubricant to the feed screw 227. Because of the pressure of the lower end 222 of the plunger 216 on the face 223, there will be little loss of oil in passing from the unit 212 to the screw 227, particularly since such flow takes place without much pressure.

The outlet ends of the flow metering units 192 and 194, as shown best in Figs. 2 and 3, will feed the passageways 242 and 243 having the inlet recesses 244 and 245. These passageways 242 and 243 in turn feed bearings located at 240 and 241 in the mechanism.

In operation, the lubricant will be fed under pressure from the pump 57. This will force lubricant into the junction 76 from which it will be fed directly past the metering units 79, 80 to the outlet drips 93 and 94 to feed the gear trains.

At the same time, the lubricant will also be fed through the unrestricted outlets of the junction, as indicated at 81 and 82, Fig. 2, to the adapter units 100 and 101 where it will flow into the bore systems 140 and 187 at the opposite sides of the carriage structure 12.

The lubricant from the adapter unit 101 will flow (a) past the metering fitting 119 to drip on one of the gear trains from the drip pipe 130; (b) past the metering unit 146 to the capillary passages 151 to the opposite sides 153 of the way 11; and (c) through the bore 150 and the upwardly extending bore 154 to the grooves 155 and the reservoir 158.

From the reservoir 158 it will flow through the recess 165 and overflow through the tubes 160, 166 and 167 to lubricate the transverse slide bearings of the cross slide and of the feed screw nut bearing of the cross slide.

From the adapter 101 the lubricant will flow past the meter units 192 and 194, where it will feed bearings at 240 and 241 in the apron structure. It will also flow past units 201, 212 and 202.

The flow metering unit 212, as best shown in Fig. 7, will feed the screw bearings 227; the flow metering unit 202 will feed the opposite faces 153 of the way 11, as best shown in Fig. 6; while the passageway 203 (see Fig. 3) will feed the way structure at the opposite side of the lathe.

It is thus apparent that the present applicant has provided a simple, ingenious oil distribution arrangement for a lathe, which will be trustworthy in operation, each bearing automatically receiving its required oiling.

The centralized lubricating equipment is substantially altogether concealed, as indicated in Fig. 1, and the construction is most compact and may be assembled on the apron carriage and cross slide without increasing the bulk or substantially increasing the cost of manufacture.

Each operation of the pump 57 will ordinarily supply about 12 drops of oil into the system, which small quantity of oil will be correctly proportioned at about 10 bearing points.

The tubing which is used is preferably for a bore of not more than ⅛ of an inch, so that there will be no tendency for the air bubbles to be trapped.

With the drilled passages, however, as indicated at 149, 150, 195, 203, 196 and 204 (see Fig. 3), it is desirable to drill larger holes of larger diameter.

Since this presents the problem of trapping of air bubbles, it is desirable to utilize filler rods in such passageways of diameter of about ¹⁄₃₂ of an inch less than the drilled hole, as indicated, for example, at 115 in Fig. 5, 149a, 150a, 198 and 206 in Figs. 3 and 6, and 210 in Fig. 7.

The provision of passageways which are so small as to prevent countercurrent flow of air and oil combined with check valves in each flow metering unit, as for example indicated at 88 in Fig. 13, and 126 in Figs. 11 and 12, will maintain the distributing tubing and bore system full of oil at all times both before and after the flow metering units, and in this way even a small quantity of oil discharged by the pump 57 into distributing system will give a definite pressure rise before the flow metering outlet units of Figs. 11 to 13, which pressure will rise as high as 40 to 50 pounds per square inch.

Even without the use of the filler rods 115, 149a, 150a, 198, 206 and 210, it will be possible to obtain a pressure of 5 to 8 pounds per square inch, which will assure the desired distribution of lubricant.

The present application is a division of application Serial No. 350,653, filed August 3, 1940, now Patent No. 2,447,509, dated August 24, 1948.

It will be understood that many changes could be made in the particular features of lathe as shown, and many apparently widely different embodiments of this invention could be made without departing from the scope thereof, and it is intended that all matter contained in the above description shall be interpreted as illustrative and not in a limiting sense.

What is claimed is:

1. In a lubricating installation for a cross slide of a lathe having bearings to be lubricated, a recess extending over the top of the cross slide serving as a reservoir, means to feed said recess with lubricant, a plurality of vertical bores communicating with said recess, said bores being fitted with tubes having narrow capillary bores, said capillary bores extending up within said recess to serve as overflow pipes and conducting lubricant downwardly to the slide bearings of the cross slide.

2. In a lubricating installation for a cross slide of a lathe having bearings to be lubricated, a recess extending over the top of the cross slide serving as a reservoir, means to feed said recess with lubricant, a plurality of vertical bores communicating with said recess, said bores being fitted with tubes having narrow capillary bores, said capillary bores extending up within said recess to serve as overflow pipes and conducting lubricant downwardly to the slide bearings of the cross slide, said means to feed said reservoir with lubricant including a groove system on the bottom of said cross slide, means to feed lubricant into said groove system from the carriage, and a tube extending up through the cross slide from said groove system to a level higher than the level of said downflow capillary tubes.

3. In a machine of the type comprising a bed, a carriage having a slide bearing upon said bed, an apron extending below said carriage, means wholly confined within the structure of the machine for lubricating said slide bearing, said means comprising a source of lubricant supply and pressure on the apron, said carriage being provided with a rising bore extending upwardly from the apron into the carriage, said bore being fed with lubricant from a lubricant pump positioned in the apron, a gasket compressed in a countersunk depression about the bore at the surface of contact of apron and carriage for effecting a lubricant-tight connection from the apron to the carriage, a transverse bore in said carriage communicating with said first-mentioned bore, capillary outlets from said transverse bore leading to said bearing, and a flow metering unit completely lodged in said transverse bore at a portion of the length thereof between said rising bore and said capillary outlets.

4. In a machine of the type comprising a bed, a carriage having a slide bearing upon said bed, an apron extending below said carriage, means wholly confined within the structure of the machine for lubricating said slide bearing, said means comprising a source of lubricant supply and pressure on the apron, said carriage being provided with a rising bore extending upwardly from the apron into the carriage, said bore being fed with lubricant from a lubricant pump positioned in the apron, a gasket supported and compressed in a countersunk passage about the bore at the surface of contact between the apron and the carriage for effecting a lubricant-tight connection therebetween, a transverse bore in said carriage communicating with said first mentioned bore, capillary outlets from said transverse bore feeding said bearing, a flow metering unit completely lodged in said transverse bore at a portion of the length thereof between said rising bore and said capillary outlets, and rods filling the major portion of the cavity determined by said transverse bore.

5. In a machine of the type comprising a bed, lubricated mechanism mounted in said bed, a carriage having a slide bearing upon said bed, an apron extending below said carriage, means wholly confined within the structure of the machine for lubricating said mechanism and said slide bearing, said means comprising a means of lubricant supply and pressure on the apron, said carriage being provided with a rising bore extending upwardly from the apron into the carriage, said bore being fed with lubricant from a lubricant pump positioned in the apron, a gasket supported and compressed in a countersunk passage about the bore at the surface of contact between the apron and the carriage for effecting a lubricant-tight connection therebetween, a longitudinal bore in said carriage communicating with said first mentioned bore, transverse bores in said carriage communicating with said longitudinal bore, capillary outlets from one of said transverse bores feeding said bearing, a flow metering unit completely lodged in said latter bore, in advance of said capillary outlets, a flow metering unit in the other transverse bore and extending downwardly therefrom to said bed, an outlet through said bed delivering lubricant to the mechanism in said bed, and rods filling the major portion of the cavity determined by said transverse bores.

6. A lathe lubrication installation for a lathe having a plurality of bearings to be lubricated including ways supporting a carriage having an apron and ways on the carriage supporting a transverse structure in turn supporting a tool carrier, said apron having a lubricant-receiving pocket, a reciprocating small-diameter piston pump positioned on a vertical axis in said pocket at the bottom thereof, a junction on the wall of said pocket, said apron having a shifter lever rod extending horizontally thereof adjacent said pump and a lever actuated by said rod to reciprocate the piston of said pump, a lubricant tubing outlet extending from said pump to said junction and outlet tubes extending from said junction to feed lubricant to said ways and bearings to be lubricated.

7. The installation of claim 6 in which said carriage has a plurality of passages extending longitudinally thereof in the direction of the major axis of the lathe which receive lubricant from said outlet tubes and supply lubricant to said ways and bearings.

8. The installation of claim 6 in which the carriage is provided with a series of transverse passageways terminating in vertical recesses, said transverse passageways receiving lubricant from said outlet tubings and carrying filler pins and terminating in vertical recesses substantially closed off by high restriction flow metering fittings.

References Cited in the file of this patent
UNITED STATES PATENTS

| Number | Name | Date |
|---|---|---|
| 531,590 | Howells | Dec. 25, 1894 |
| 1,257,258 | Lemp | Feb. 19, 1918 |
| 1,497,503 | Greuter | June 10, 1924 |
| 1,797,547 | Class | Mar. 24, 1931 |
| 1,850,924 | Day | Mar. 22, 1932 |
| 1,862,488 | Bijur | June 7, 1932 |
| 1,885,222 | Boland | Nov. 1, 1932 |
| 1,911,450 | Kocher | May 30, 1933 |
| 2,005,725 | Banfield | June 25, 1935 |
| 2,005,766 | Wright | June 25, 1935 |
| 2,009,429 | Bijur | July 30, 1935 |
| 2,079,700 | Archea | May 11, 1937 |
| 2,140,983 | Carter | Dec. 20, 1938 |

FOREIGN PATENTS

| Number | Country | Date |
|---|---|---|
| 712,495 | France | July 21, 1931 |